(12) United States Patent
Pimlott et al.

(10) Patent No.: US 12,246,775 B2
(45) Date of Patent: Mar. 11, 2025

(54) MUD FLAP SYSTEM WITH UNIVERSAL ADAPTER

(71) Applicant: Bulletproof Hitches LLC, Bradenton, FL (US)

(72) Inventors: Christopher Pimlott, Bradenton, FL (US); Philip Lambert, Bradenton, FL (US)

( * ) Notice: Subject to any disclaimer, the term of this patent is extended or adjusted under 35 U.S.C. 154(b) by 179 days.

(21) Appl. No.: 18/188,653

(22) Filed: Mar. 23, 2023

(65) Prior Publication Data

US 2024/0409162 A1    Dec. 12, 2024

(51) Int. Cl.
*B62D 25/16*     (2006.01)
*B62D 25/18*     (2006.01)

(52) U.S. Cl.
CPC ......... *B62D 25/166* (2013.01); *B62D 25/182* (2013.01)

(58) Field of Classification Search
CPC .. B62D 25/166; B62D 25/182; B62D 25/188; B62D 25/186; B62D 25/168; B62D 25/184
See application file for complete search history.

(56) References Cited

U.S. PATENT DOCUMENTS

| | | | | |
|---|---|---|---|---|
| 5,121,944 A | * | 6/1992 | Haddox | B62D 25/188 280/848 |
| 5,593,172 A | * | 1/1997 | Breslin | B60D 1/155 280/491.5 |
| 5,823,571 A | * | 10/1998 | Cominsky | B62D 25/188 280/847 |
| 6,076,842 A | * | 6/2000 | Knoer | B62D 25/188 224/42.31 |
| 6,179,311 B1 | * | 1/2001 | Larkin | B62D 25/188 280/154 |
| 6,484,984 B2 | * | 11/2002 | Hawes | B62D 25/188 248/220.21 |
| 6,955,369 B1 | * | 10/2005 | Schiebout | B60D 1/58 280/154 |
| 7,407,194 B1 | * | 8/2008 | Alley | B62D 25/188 280/154 |
| 7,931,302 B2 | * | 4/2011 | Vaughn | B62D 25/186 280/847 |

(Continued)

FOREIGN PATENT DOCUMENTS

CA         2823394 A1 *  2/2014  ......... B62D 25/182

*Primary Examiner* — James A Shriver, II
*Assistant Examiner* — Ian Bryce Shelton
(74) *Attorney, Agent, or Firm* — Larson & Larson; Justin P. Miller; Frank Liebenow

(57) ABSTRACT

The mudflap system with universal adapter is centered on a bracket. The bracket includes optional inserts that can be added or removed to change the size of the bracket recess. By changing the size of the bracket recess, a single bracket may be used on multiple sizes of ball mount—the ball mount being portion of the vehicle's hitch system that generally protrudes from the receiver, accepting trailer coupler to connect to the trailer. The bracket includes tab recesses interface with tabs present on the inserts. The tabs and associated recesses act to align the inserts with the bracket and prevent over-insertion, thereby preventing the inserts from falling out during assembly. After placement of an insert within the bracket, threaded fasteners are used to clamp the bracket to the ball mount and to hold the inserts in position.

12 Claims, 8 Drawing Sheets

(56) References Cited

U.S. PATENT DOCUMENTS

| | | | | |
|---|---|---|---|---|
| 8,783,727 B2* | 7/2014 | Flaman | ................ | B62D 25/182 |
| | | | | 280/852 |
| 9,387,888 B2* | 7/2016 | Schmeichel | ......... | B62D 25/188 |
| 9,724,974 B2* | 8/2017 | Schmeichel | ......... | B62D 25/182 |
| 10,086,879 B2* | 10/2018 | Schmeichel | ......... | B62D 25/163 |
| 10,300,960 B1* | 5/2019 | Wingen | ................... | B60D 1/58 |
| 2009/0194967 A1* | 8/2009 | Vaughn | ............... | B62D 25/188 |
| | | | | 280/154 |
| 2014/0042736 A1* | 2/2014 | Flaman | ................ | B62D 25/182 |
| | | | | 280/851 |
| 2016/0114835 A1* | 4/2016 | Schmeichel | ......... | B62D 25/182 |
| | | | | 280/851 |
| 2016/0318554 A1* | 11/2016 | Schmeichel | ............. | B60D 1/58 |
| 2018/0178850 A1* | 6/2018 | Schmeichel | ......... | B62D 25/188 |
| 2022/0194480 A1* | 6/2022 | Stolworthy | ............. | B60D 1/58 |
| 2023/0092434 A1* | 3/2023 | Stolworthy | ............... | B60R 3/00 |
| | | | | 280/851 |

* cited by examiner

MUD FLAP SYSTEM WITH UNIVERSAL ADAPTER

FIELD

This invention relates to the field of mud flap hardware and more particularly to a system for affixing mud flaps to a variety of different ball mount sizes.

BACKGROUND

Mud flaps, or mud guards, are an important accessory for use with any vehicle that drives on the road.

Mud flaps serve two primary purposes: to protect the body of the vehicle; and to prevent dirt and debris from flying up from the tires and hitting towed vehicles or pedestrians.

Mud flaps are typically made from a flexible material, such as rubber or plastic, and are available in a variety of sizes and styles to suit the vehicle. Mud flaps are commonly mounted directly to the vehicle using conventional fasteners.

The drawback of conventional mounting methodologies for mudflaps is that the size of the mudflap is often limited, leaving uncovered areas where debris can exit at high speed. The result of this uncovered area is that debris from underneath the tow vehicle can be thrown up against the trailer, resulting in damage.

Because wider mud flaps are needed only during towing, it is reasonable to integrate them into the towing hardware.

But towing hardware varies in dimensions.

What is needed is the mudflap mounting system that can accommodate multiple sizes of towing hardware.

SUMMARY

The mudflap system with universal adapter is centered on a bracket. The bracket includes optional replaceable inserts that can be added or removed to change the size of the bracket recess.

By changing the size of the bracket recess, a single bracket may be used on multiple sizes of ball mount—the ball mount being the portion of the vehicle's hitch system that protrudes from the receiver, accepting a trailer coupler to connect to the trailer.

The bracket includes tab recesses that interface with tabs present on the inserts. The tabs and associated recesses act to align the inserts with the bracket and prevent over-insertion. Thereby the tabs prevent the inserts from falling out, or falling through, during assembly.

Threaded fasteners are used to clamp the bracket to the ball mount and to hold the inserts in position. The threaded fasteners include a vertical clamping fastener and a horizontal clamping fastener, each of which passes from the outside of the bracket through to the central bracket recess.

Protruding from the bracket are projections that interface with pivot arms. The pivot arms in turn interface with the flexible flaps, or mud flaps, holding the flexible flaps in position behind the vehicle's wheels.

The pivot arms are held to the bracket using fasteners, the fasteners clamping the pivot arms in place. The axis of one end of the pivot arm, which interfaces with the bracket, is parallel but separated from the axis that interfaces with the mud flaps. The result is that rotation of the pivot arms increases or decreases the elevation of the mud flaps with respect to the bracket, while also moving the mud flaps forward and backward. This allows a user to adjust the mud flap position with respect to the tires to ensure optimum mud flap function.

The pivot arms end in clamps that grip tubes, which are in turn fastened to the flexible flaps. This provides further customization of the position of the mud flaps, allowing for rotation of the mud flaps to create a vertical face or an offset face.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
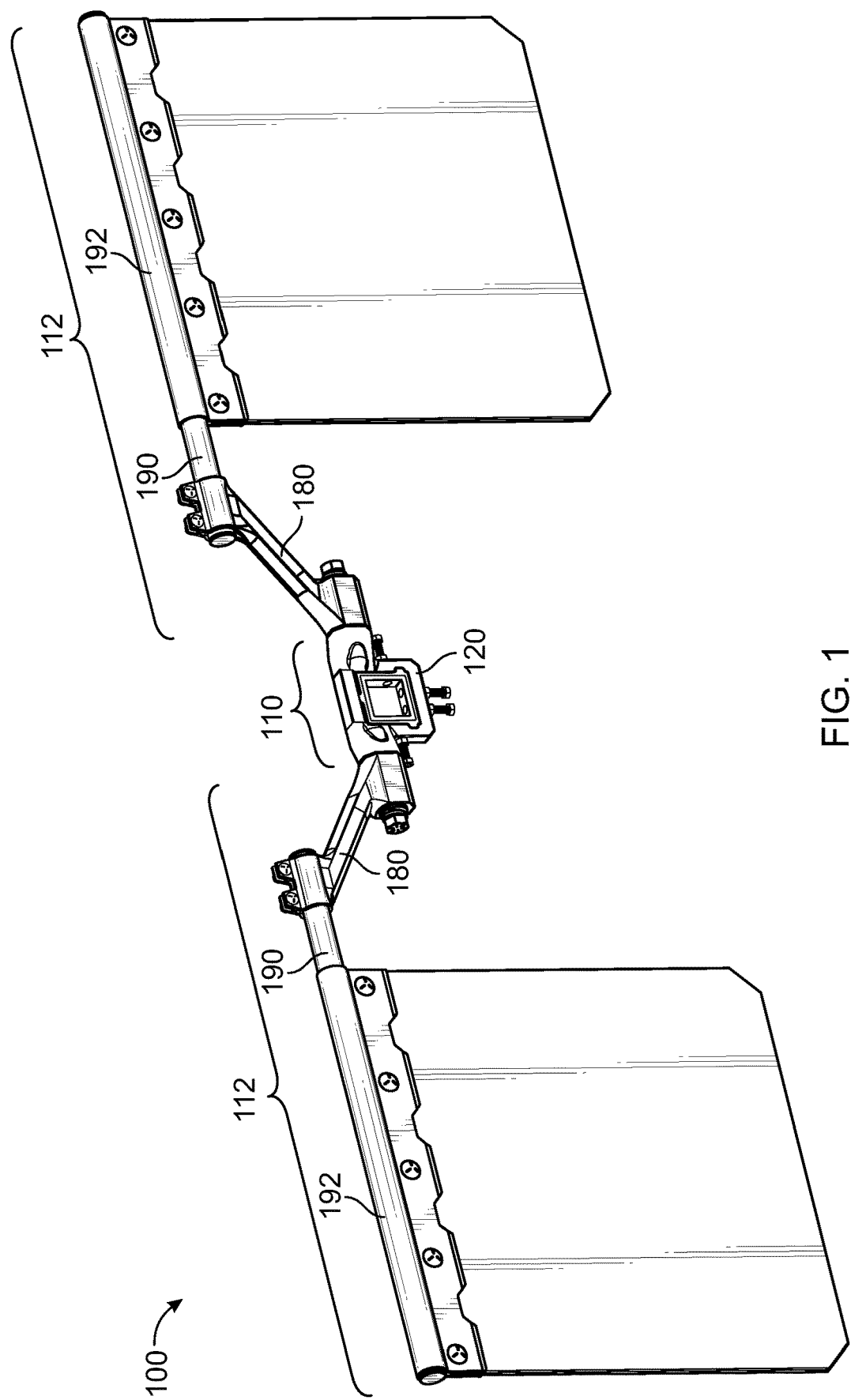
FIG. 1 illustrates an isometric view of a fully assembled system of the mud flap system with universal adapter.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an isometric view of a fully assembled system of the mud flap system with universal adapter is shown.

The mud flap system with universal adapter 100 is shown formed from the ball mount interface 110 and the flap support 112. The ball mount interface 110 includes the bracket 120.

The flap support 112 includes the pivot arms 180, flap tubes 190, and flap brackets 192.

Figure 2:
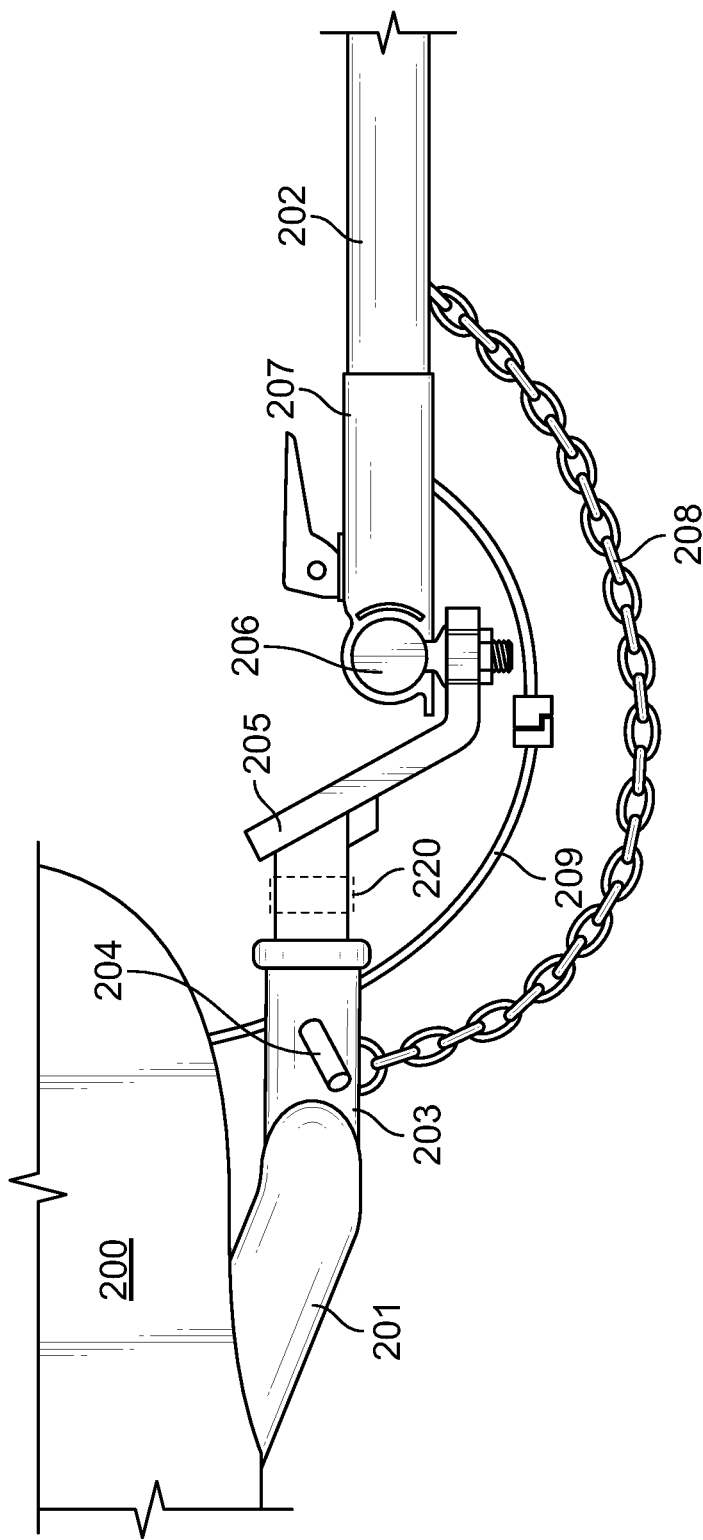
FIG. 2 illustrates a schematic view of a typical trailer hitch and trailer head of the mud flap system with universal adapter.

Referring to FIG. 2, a schematic view of a typical trailer hitch and trailer head of the mud flap system with universal adapter is shown.

The tow vehicle 200 includes a trailer hitch 201, receiver tube 203, and ball mount 205 held within the receiver tube 203 by the hitch pin 204. A trailer ball 206 is affixed to the ball mount 205, over which the trailer coupler 207 fits. The trailer 202 is affixed to the trailer coupler 207. Safety chains 208 and wiring harness 209 connect the trailer 202 to the tow vehicle 200.

Bracket location on ball mount 220 is the preferred location for mounting the bracket 120 (see FIG. 1).

Figure 3:
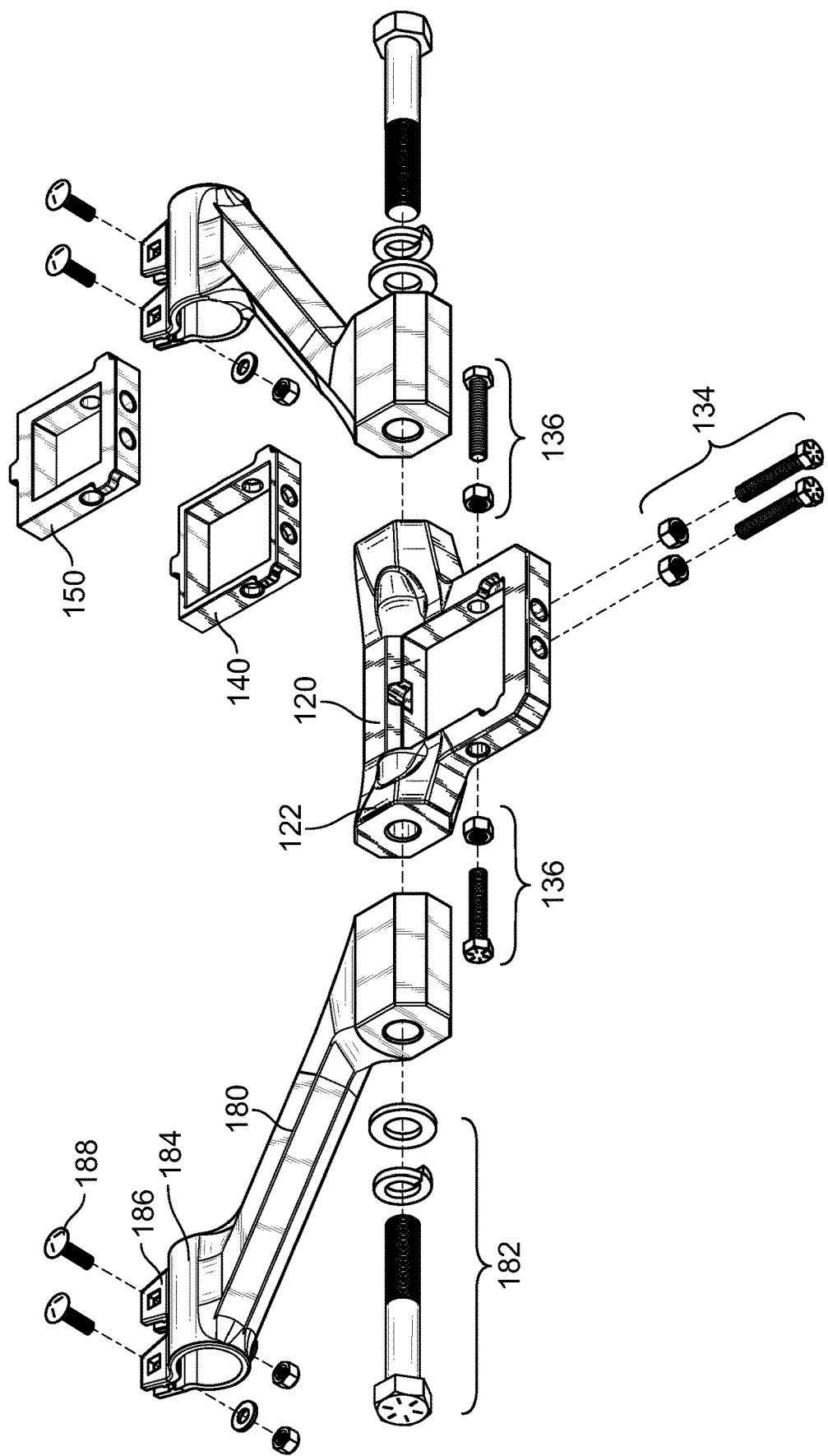
FIG. 3 illustrates an exploded view of a portion of the mud flap system with universal adapter.

Referring to FIG. 3, an exploded view of a portion of the mud flap system with universal adapter is shown.

The bracket 120 includes bracket projections 122. The first insert 140 or the second insert 150 or optionally inserted into the bracket recess 124, depending on the size that best fits the ball mount 205 (See FIG. 2).

Vertical fasteners with locknut 134 and horizontal fasteners with locknut 136 prevent motion of the bracket 120 with respect to the ball mount 205, and affix an insert, for example first insert 140, in place.

Pivot arm 180 is affixed to the bracket 120 by pivot arm fasteners 182. Also shown are pivot arm sleeves 184 with pivot arm tabs 186, clamped in place by pivot arm clamping fasteners 188.

Figure 4:
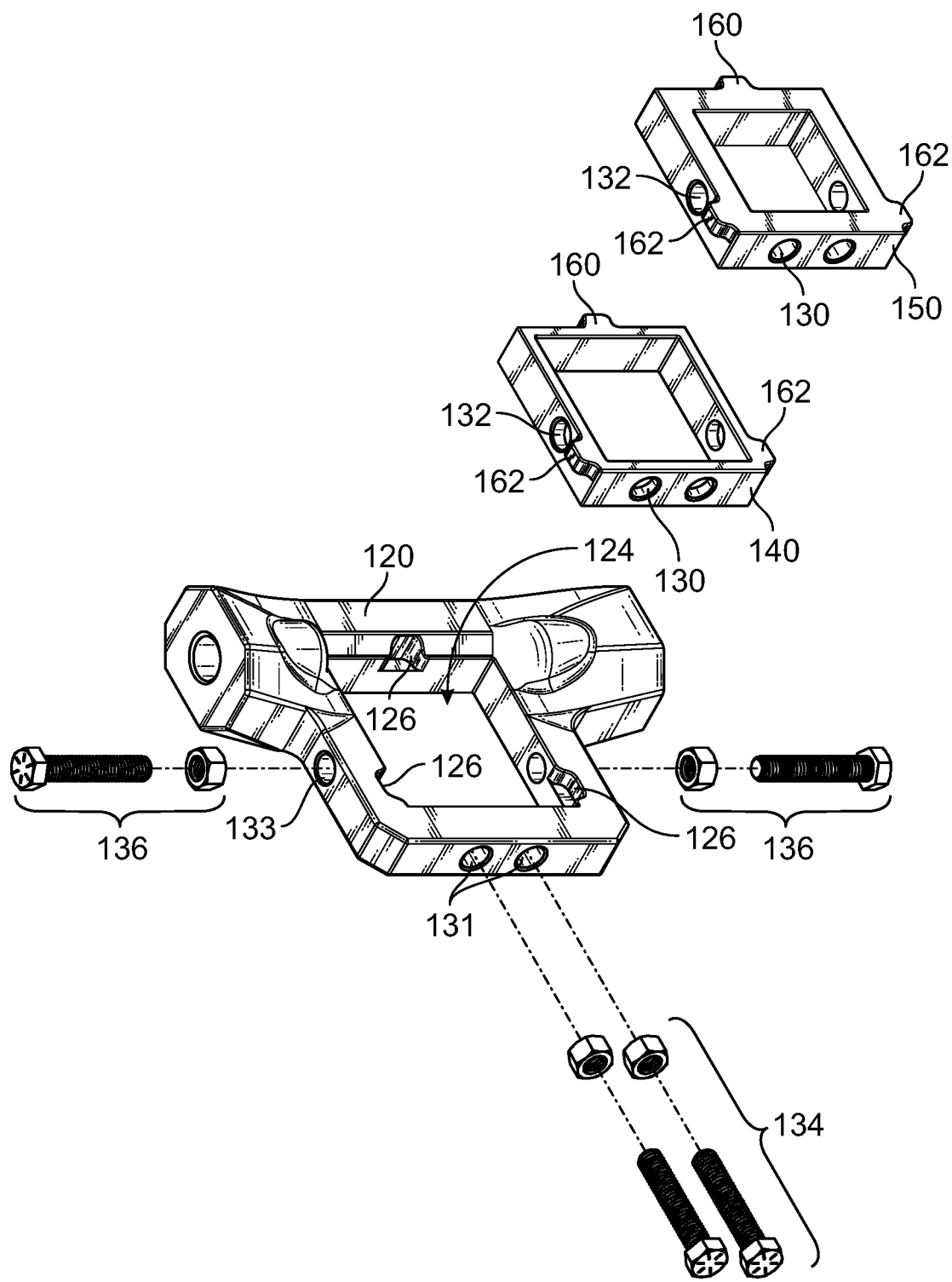
FIG. 4 illustrates an exploded view of the bracket and inserts with fasteners of the mud flap system with universal adapter.

Referring to FIG. 4, an exploded view of the bracket and inserts with fasteners of the mud flap system with universal adapter is shown.

The size of the bracket recess 124 of the bracket 120 is adjustable through the use of optional inserts. The bracket 120 may be used as-is, without any inserts. In such a situation the bracket 120 is installed, the vertical fasteners with locknut 134 passed through threaded vertical clamping holes 131 to compress the inner bearing surface 164 against the ball mount 205, holding the bracket 120 in place. The horizontal fasteners with locknut 136 are passed through the threaded horizontal clamping holes 133, providing additional compressive force and also centering the bracket 120.

If an insert is used, for example first insert 140, the first insert 140 is placed into the bracket recess 124, until the upper alignment tab 160 and lower alignment tabs 162 rest within the tab recesses 126.

Figure 5:
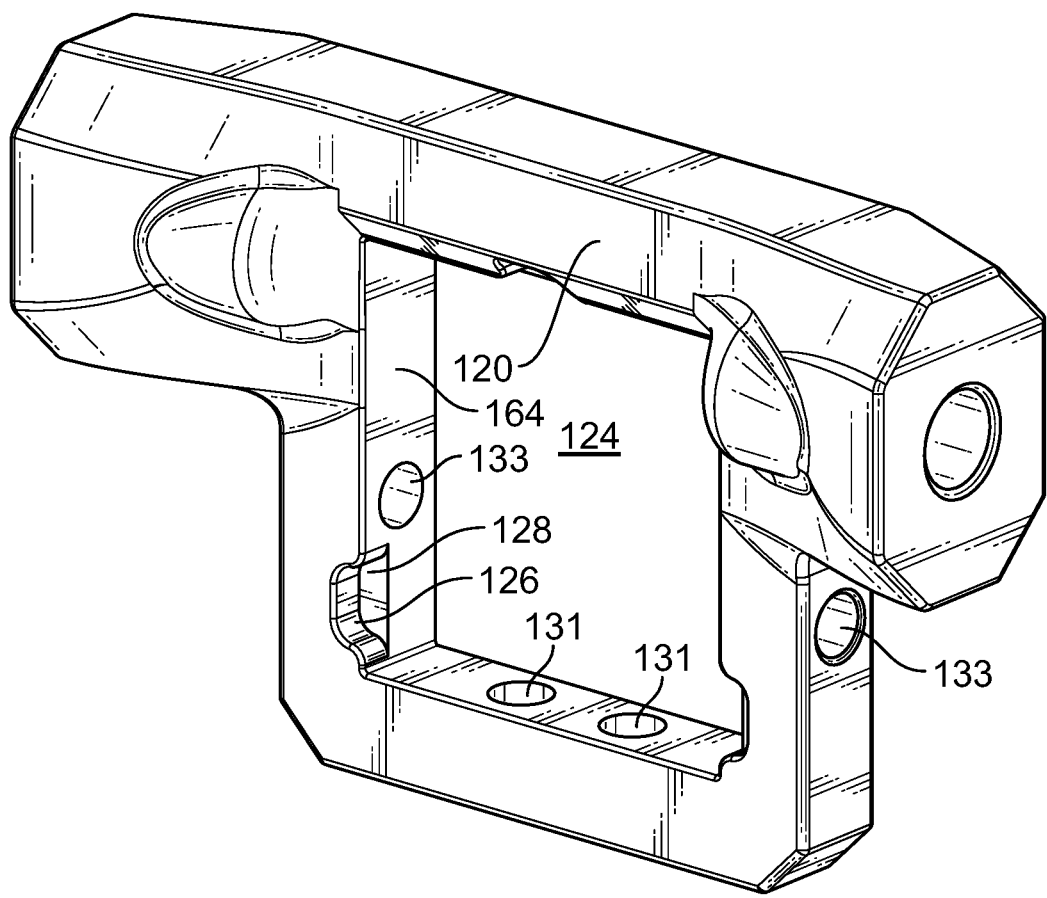
FIG. 5 illustrates a first detailed view of the bracket of the mud flap system with universal adapter.
Figure 6:
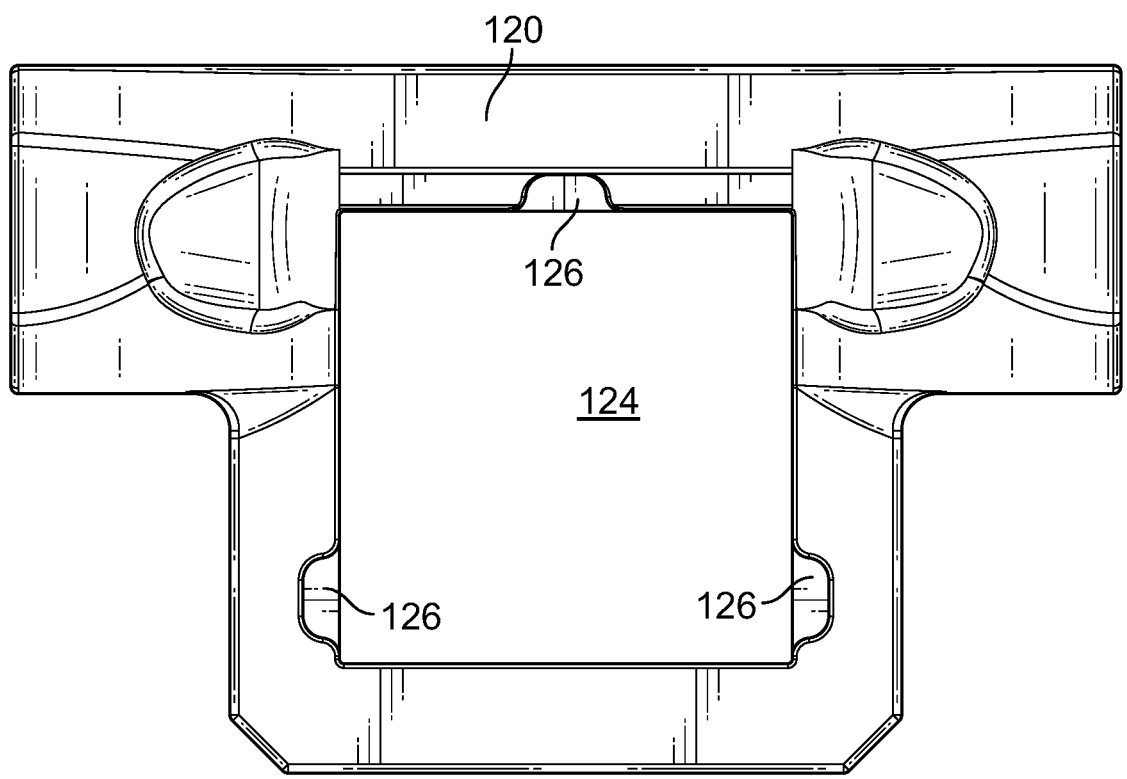
FIG. 6 illustrates the second detailed view of the bracket of the mud flap system with universal adapter.

Referring to FIGS. 5 and 6, first and second detailed views of the bracket of the mud flap system with universal adapter are shown.

The bracket 120 is shown with central bracket recess 124. Tab recesses 126 are shown where the first insert 140 or second insert 150 will rest (see FIG. 3). The tab recesses 126 include a tab face 128 against which the tab rear face 163 will rest when, for example, the first insert 140 is fully placed within the bracket 120. The interaction of the tab recesses 126 and tabs 160/162 prevents over-insertion of the inserts 140/150 into the bracket 120.

Also shown are vertical clamping holes 130 for vertical fasteners with locknut 134 (see FIG. 3) and horizontal clamping holes 132 for horizontal fasteners with locknut 136 (see FIG. 3).

Figure 7:
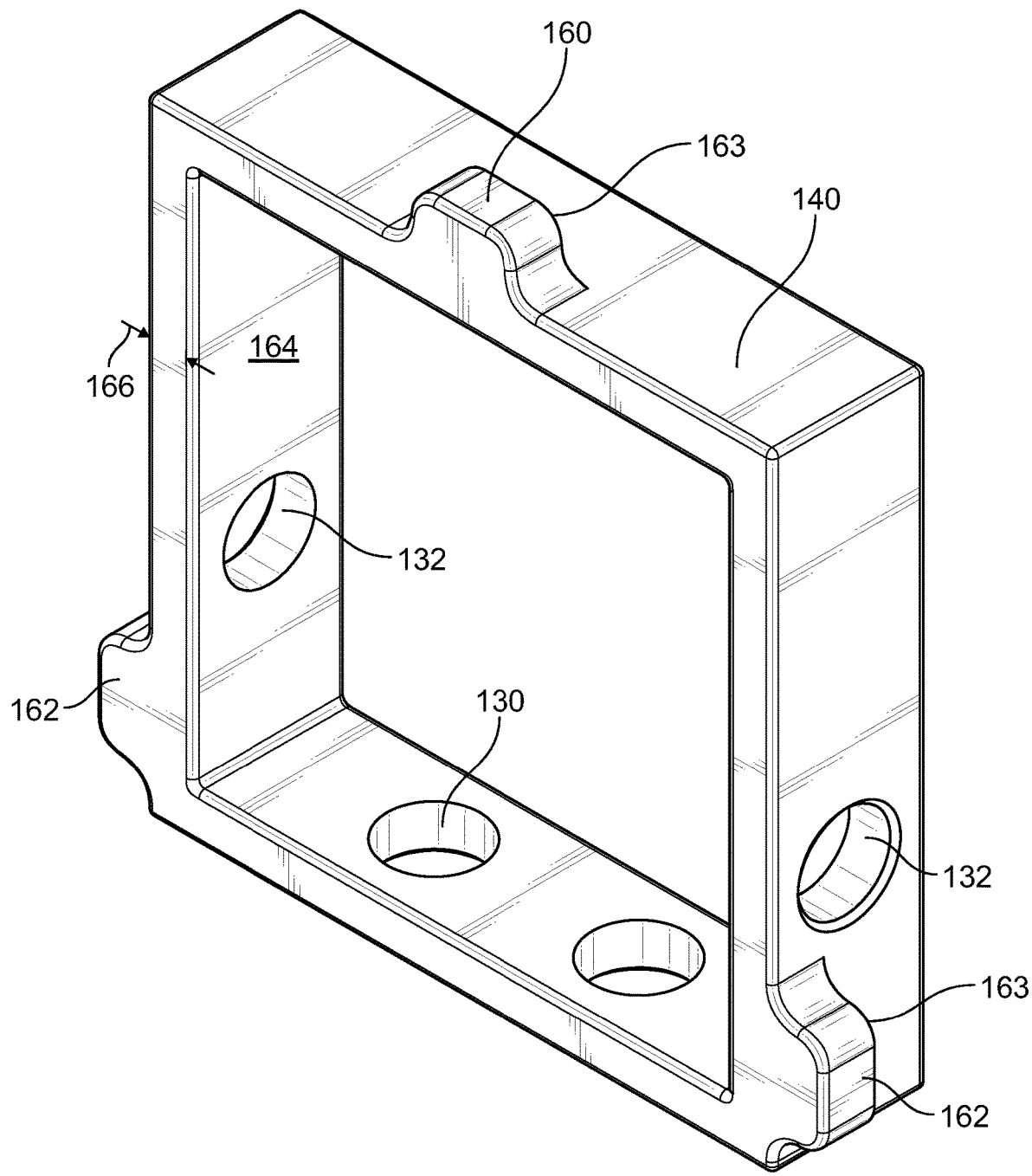
FIG. 7 illustrates a detailed view of the first insert of the mud flap system with universal adapter.
Figure 8:
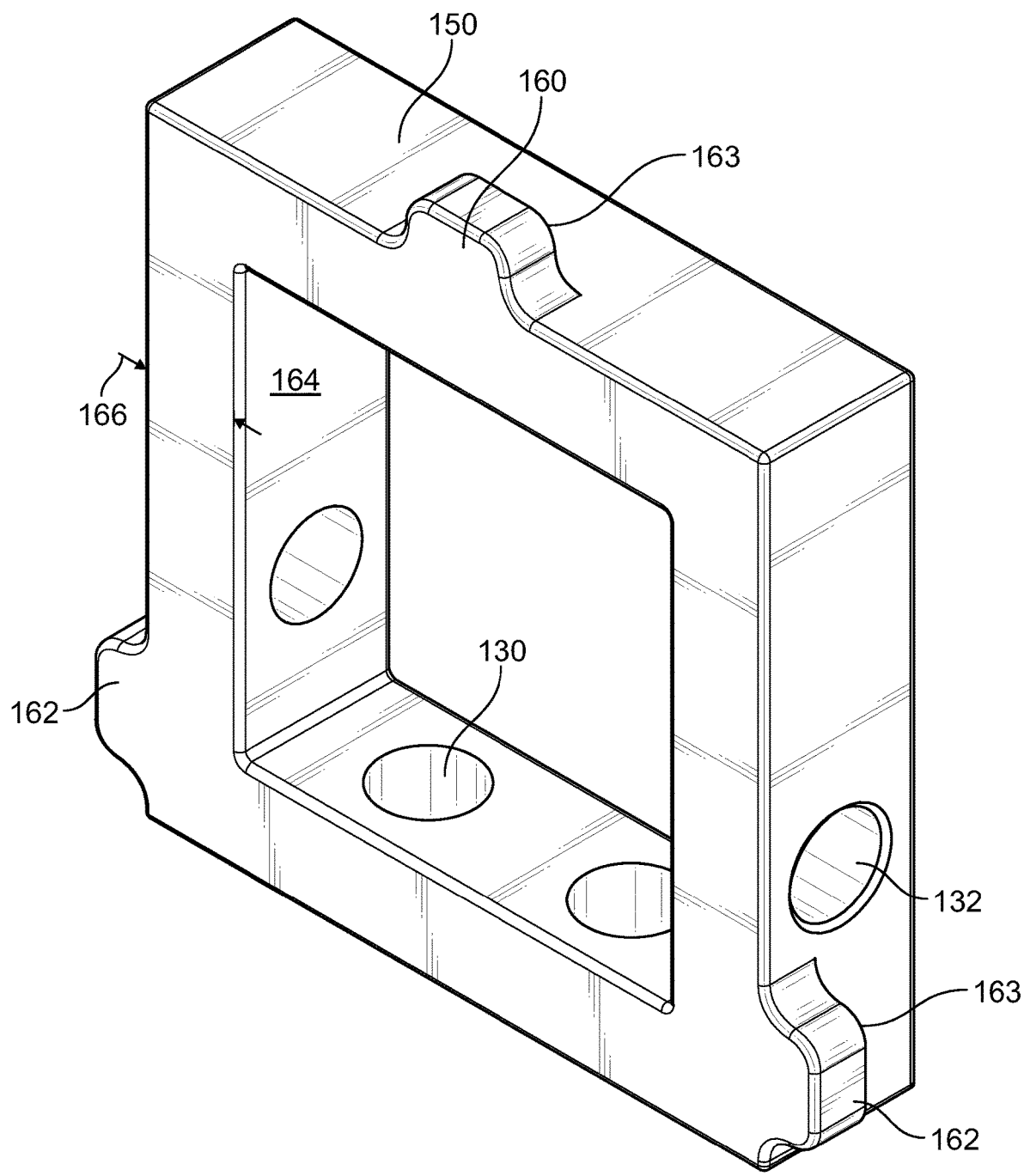
FIG. 8 illustrates a detailed view of the second insert of the mud flap system with universal adapter.

Referring to FIGS. 7 and 8, detailed views of the first and second inserts of the mud flap system with universal adapter are shown.

The first insert 140 and the second insert 150 each include an upper alignment tab 160 and a lower alignment tab 162, each with tab rear faces 163. Also shown are vertical clamping holes 130 and horizontal clamping holes 132, which in the preferred embodiment are unthreaded, but in alternative embodiments are threaded.

The first insert 140 and the second insert 150 also include an inner bearing surface 164 for contact with the ball mount. Differing wall thicknesses 166 allow the user to choose the thinner insert, for example first insert 140, or the thicker insert, for example second insert 150, depending on the appropriate size required.

Equivalent elements can be substituted for the ones set forth above such that they perform in substantially the same manner in substantially the same way for achieving substantially the same result.

What is claimed is:

1. A device to affix mud flaps to a rear of a vehicle, the device comprising:
    a bracket with one or more replaceable inserts;
        the bracket including a central recess;
            the central recess to interface with a ball mount, the ball mount interfacing with a receiver of a tow vehicle;
        the one or more replaceable inserts fitting within the central recess;
            each replaceable insert of the one or more replaceable inserts decreasing a size of the central recess in the bracket;
    a vertical clamping fastener;
        the vertical clamping fastener passing from an outside of the bracket to the central recess for compression against the ball mount;
        the vertical clamping fastener passing through a hole in the one or more replaceable inserts;
    a tab recess adjacent to the central recess of the bracket;
    each of the one or more replaceable inserts including a protruding tab;
        the protruding tab interfacing with the tab recess when the one or more replaceable inserts is installed within the central recess;
        whereby interaction of the tab recess and the protruding tab ensures alignment of the one or more replaceable inserts with the bracket and prevents over insertion of the one or more replaceable inserts; and
    whereby the one or more replaceable inserts can be removed or swapped to best fit the ball mount.

2. The device to affix mud flaps to the rear of the vehicle of claim 1, further comprising:
    a first pivot arm;
        the first pivot arm protruding from the bracket;
        the first pivot arm rotatably connected to the bracket;
        the first pivot arm including a clamping fastener that affixes to a flap tube, the flap tube supporting a flexible flap;
        rotation of the first pivot arm with respect to the bracket moving the flexible flap both forward and backward, as well as up and down;
    whereby rotation of the first pivot arm allows for control of a position of the flexible flap with respect to the ball mount.

3. The device to affix mud flaps to the rear of the vehicle of claim 1, further comprising:
    a horizontal clamping fastener;
        the horizontal clamping fastener passing from an outside of the bracket through to the central recess for compression against the ball mount;
        the horizontal clamping fastener passing through a horizontal hole in the one or more replaceable inserts;
    whereby the horizontal clamping fastener helps to maintain a horizontal position of the bracket with respect to the ball mount.

4. The device to affix mud flaps to the rear of the vehicle of claim 2, further comprising:
    a horizontal clamping fastener;
        the horizontal clamping fastener passing from an outside of the bracket through to the central recess for compression against the ball mount;
        the horizontal clamping fastener passing through a horizontal hole in the one or more replaceable inserts;
    whereby the horizontal clamping fastener helps to maintain a horizontal position of the bracket with respect to the ball mount.

5. A system for mounting mud flaps to differing ball mount sizes, the system comprising:
    a bracket with a bracket recess;
        the bracket recess to interface with a first ball mount, having a first size, for a tow vehicle;
        the bracket recess having an inner recess width;
        the bracket including one or more tab recesses;
    a first insert;
        the first insert fitting within the bracket recess;
        the first insert having a first insert recess;

the first insert recess to interface with a second ball mount, having a second size, for the tow vehicle;

the second ball mount being smaller than the first ball mount;

a tab recess adjacent to the bracket recess of the bracket;

the first insert including a protruding tab;

the protruding tab interfacing with the tab recess when the first insert is installed within the bracket recess;

whereby interaction of the tab recess and the protruding tab ensures alignment of the first insert with the bracket and prevents over insertion of the first insert; and whereby differing ball mount sizes are compensated for by mounting the bracket by itself, or in combination with the first insert.

6. The system for mounting mud flaps to differing ball mount sizes of claim 5, further comprising:

a first pivot arm;

the first pivot arm protruding from the bracket;

the first pivot arm rotatably connected to the bracket;

the first pivot arm including a clamping fastener that affixes to a flap tube, the flap tube supporting a flexible flap;

rotation of the first pivot arm with respect to the bracket moving the flexible flap both forward and backward, as well as up and down;

whereby rotation of the first pivot arm allows for control of a position of the flexible flap with respect to the first ball mount.

7. The system for mounting mud flaps to differing ball mount sizes of claim 5, further comprising:

a horizontal clamping fastener;

the horizontal clamping fastener passing from an outside of the bracket through to the bracket recess for compression against the first ball mount;

the horizontal clamping fastener passing through a horizontal hole in first insert;

whereby the horizontal clamping fastener helps to maintain a horizontal position of the bracket with respect to the first ball mount.

8. The system for mounting mud flaps to differing ball mount sizes of claim 5, further comprising:

a vertical clamping fastener;

the vertical clamping fastener passing from an outside of the bracket through to the bracket recess for compression against the first ball mount;

the vertical clamping fastener passing through a vertical hole in the first insert;

whereby the vertical clamping fastener helps to maintain a vertical position of the bracket with respect to the first ball mount.

9. A mud flap mounting system for use with a ball mount of a vehicle, the mud flap mounting system comprising:

a central bracket;

the central bracket including a central square hole of adjustable width;

the adjustable width set by installation of one of one or more inserts;

each insert of the one or more inserts correspondingly including a central insert square hole;

a tab recess adjacent to the central square hole of adjustable width;

each of the one or more inserts including a protruding tab;

the protruding tab interfacing with the tab recess when one of the one or more inserts is installed within the central square hole of adjustable width;

whereby interaction of the tab recess and the protruding tab ensures alignment of the one or more inserts with the central bracket and prevents over-insertion of the one or more inserts; and whereby selection of which of the one or more inserts controls a final width of the adjustable width of the central bracket.

10. The mud flap mounting system for use with a ball mount of a vehicle of claim 9, further comprising:

a first pivot arm;

the first pivot arm protruding from the central bracket;

the first pivot arm rotatably connected to the central bracket;

the first pivot arm including a clamping fastener that affixes to a flap tube, the flap tube supporting a flexible flap;

rotation of the first pivot arm with respect to the central bracket moving the flexible flap both forward and backward, as well as up and down;

whereby rotation of the first pivot arm allows for control of a position of the flexible flap with respect to the ball mount.

11. The mud flap mounting system for use with a ball mount of a vehicle of claim 9, further comprising:

a horizontal clamping fastener;

the horizontal clamping fastener passing from an outside of the central bracket through to the central square hole of adjustable width for compression against the ball mount;

the horizontal clamping fastener passing through a horizontal hole in the one or more inserts;

whereby the horizontal clamping fastener helps to maintain a horizontal position of the central bracket with respect to the ball mount.

12. The mud flap mounting system for use with a ball mount of a vehicle of claim 9, further comprising:

a vertical clamping fastener;

the vertical clamping fastener passing from an outside of the central bracket through to the central square hole of adjustable width for compression against the ball mount;

the vertical clamping fastener passing through a vertical hole in the one or more inserts;

whereby the vertical clamping fastener helps to maintain a vertical position of the central bracket with respect to the ball mount.

\* \* \* \* \*